United States Patent [19]

Havner et al.

[11] 4,455,904

[45] Jun. 26, 1984

[54] WORK FRAME CUTTING SUPPORT

[76] Inventors: Charles W. Havner, 1025 Campbell; Roger R. Havner, P.O. Box 3816, both of Jackson, Tenn. 38301

[21] Appl. No.: 431,796

[22] Filed: Sep. 30, 1982

[51] Int. Cl.³ .............................................. B26D 3/14
[52] U.S. Cl. ........................................ 83/375; 83/453; 83/464; 83/466; 83/917; 269/216
[58] Field of Search ............... 83/374, 693, 917, 375, 83/453, 452, 466; 269/216, 230

[56] References Cited

U.S. PATENT DOCUMENTS

| | | | |
|---|---|---|---|
| 1,946,027 | 2/1934 | Lowe | 296/216 |
| 2,690,574 | 10/1954 | Clark | 83/375 |
| 3,277,763 | 10/1966 | Haug | 83/917 |

*Primary Examiner*—James M. Meister
*Assistant Examiner*—J. L. Knoble
*Attorney, Agent, or Firm*—Harvey B. Jacobson

[57] ABSTRACT

A safety attachment for use with cutting apparatus having a cutting member adapted to reciprocate particularly with respect to a fixed frame structure including a support bar mounted for movement with the cutting apparatus and the cutting apparatus having successive cutting positions so that the support bar has successive work positions, at least one bell crank having one end pivotally coupled to the support bar, having its fulcrum provided with a connecting link for fixedly positioning the fulcrum in spaced relation from a reference point on the cutting apparatus, and having the other end of the bell crank free and containing an aperture therein, a working rod threaded at one end and threadedly engaging a coupling link and an intermediate portion proximate the other end of the working rod adjustably engaging in slidable relation with a support rod having a pivot coupled to said aperture, and rabbet holder means being supported in a transverse slot in a working area and having a linking coupling between the rabbet holder means and the threadedly engaging coupling.

6 Claims, 6 Drawing Figures

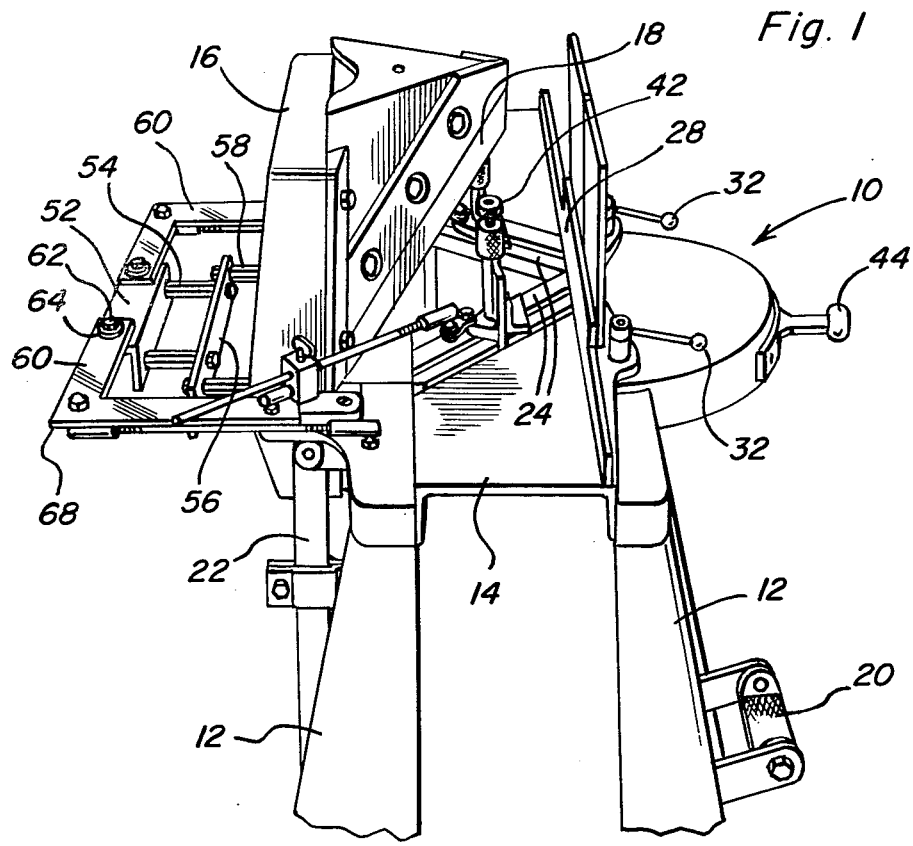
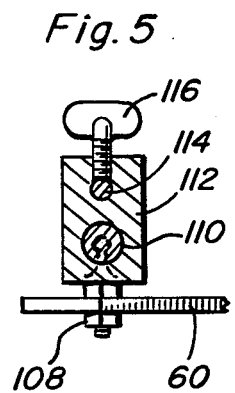
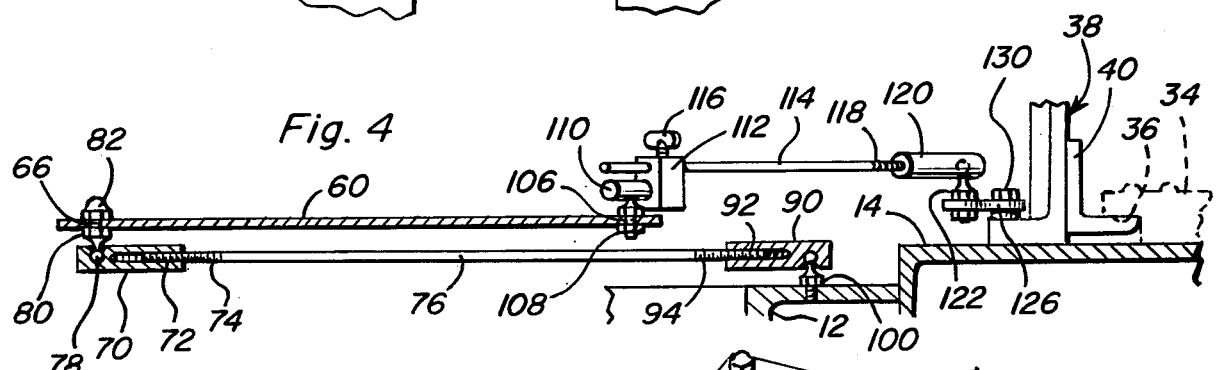
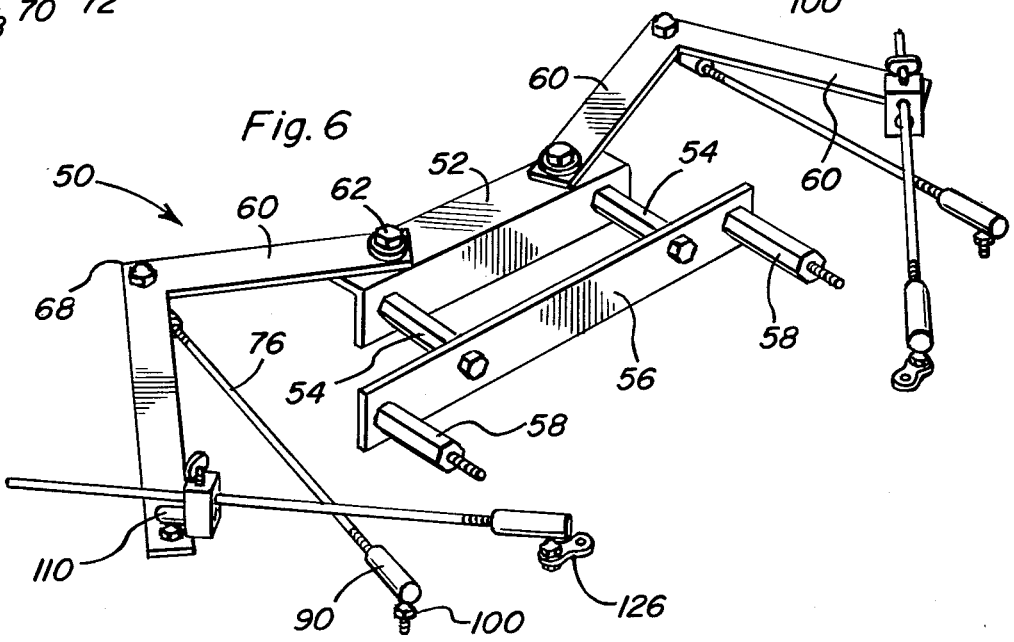

WORK FRAME CUTTING SUPPORT

BACKGROUND OF THE INVENTION

1. Field of the Invention

The present invention relates to safety attachments for use with a molding or frame cutting apparatus in which the cutting apparatus has blades which move in toward the molding in repetitive stages until the blades are completely forward over the molding ready for the final cut, and in which the safety attachments are connected to rabbet supports or holders which are moved longitudinally of the molding and yet support the molding rabbet so that the rabbet holders are continuously in proper position under the rabbet during each cut of the blades, without the necessity of an operator placing his hands near the blades each time the rabbet holders are moved. More particular, the invention relates to safety attachment for use with cutting apparatus in which each movement of the blades forward toward the molding provide for longitudinally outward movement of the rabbet holders by the attachment being flexed toward the back of the blades which in turn pulls the rabbet holders outwardly and bringing the rabbet holders out to a correct distance for the molding or workpiece to be processed by each cutting step.

2. Description of the Prior art

Various prior art and U.S. patents relate to various protective devices, guards and related arrangements, and of interest to the present invention are the following U.S. patents:

U.S. Pat. No. 443,666, F. L. Bryant
U.S. Pat. No. 450,147, L. U. Gill
U.S. Pat. No. 2,754,772, J. Anetsberger
U.S. Pat. No. 2,828,495, N. W. Sjoberg
U.S. Pat. No. 3,621,745, B. A. Cavalan et al.
U.S. Pat. No. 4,080,846, A. J. Calhoun.

The patent to Cavalan et al discloses a support tool for cutting a workpiece, a die carried by a frame, another die carried by a movable slider and clamping apparatus so that the machine shears the workpiece when between the two dies. The patent to Calhoun discloses a safety guard for insuring that an operator will not insert a hand between die parts of a press as a ram member is descending, and the patent to Sjorberg discloses various linkage arrangements. The Anetsberger patent discloses a workpiece holder or shaper which supports the workpiece when being sheared. The Gill patent discloses a workpiece engaging member which protects the hands of an operator against injury. None of these patents discloses all of the specific details of the present invention in such a way as to bear upon the patentability of any claims of the present invention.

SUMMARY OF THE INVENTION

An object and advantage of the present invention is to provide a safety, protective or guard arrangement for cutting apparatus in which the cutting apparatus has an actuator lever for progressively repositioning a cutter element in progressively forward positions while the safety device longitudinally displaces outwardly a rabbet holder each time a cut of work stock is to be made. The safety device moves the rabbet holders correspondingly longitudinally along the workpiece automatically as the cutter element moves across the workpiece. Thus, the attachment moves the rabbet holders out automatically each time the cutter element of the machine is moved for making the cut.

Another object and advantage of the present invention is to provide an attachment and safety mechanism for a cutting apparatus with blades such that with each movement of the blades forward across a workpiece for repetitive stages of cutting, the safety mechanism or attachment is flexed such that the blades move the attachment which in turn pulls rabbet holders out of the path of the cutter blades so that the rabbet holders are displaced or moved a correct distance for each movement of the blades.

Another and further object of the present invention is to provide a wood frame cutting support attachment so that the operator's hands do not come into contact with the rabbet holders, the blades of the machine or the work area while the cutter blades are in progress of sequential stages of cutting a picture, rabbeted molding or workpiece during the operation of the cutting apparatus.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side perspective view of a wood frame cutting support attachment for a cutting apparatus according to the present invention.

FIG. 4 is a sectional view taken along lines 4—4 of FIG. 2.

FIG. 5 is a sectional view taken along lines 5—5 of FIG. 3.

FIG. 6 is a generally front perspective view of solely the safety attachment mechanism of the present invention.

DESCRIPTION OF THE PREFERRED EMBODIMENT

Figure 2:
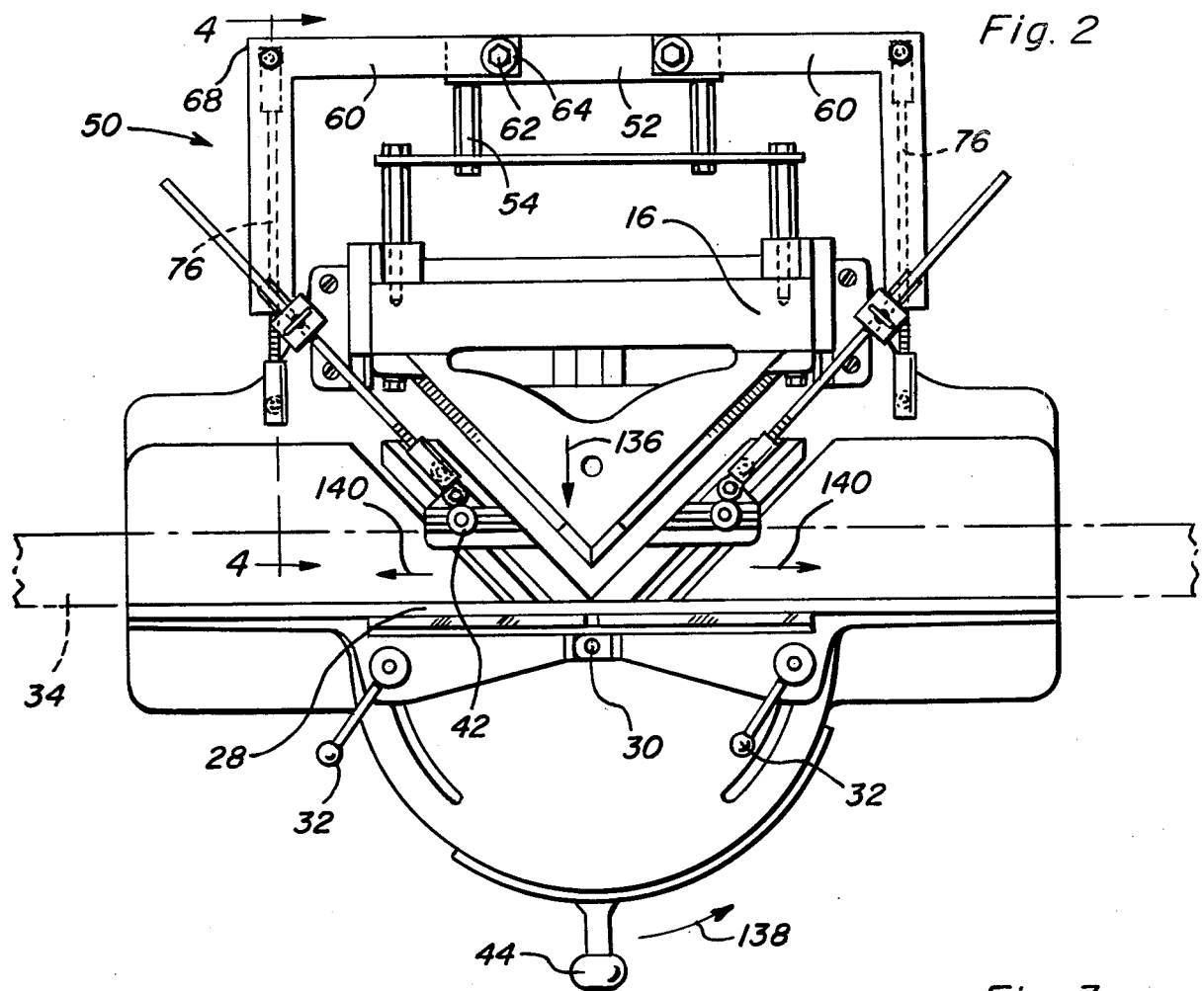
FIG. 2 is a top plan view thereof and in which the cutter blade and the attachment mechanism are shown in a first position.

Referring now to the drawings, there is shown a wood frame cutting apparatus 10 such as, for example, a mitre machine for precision cutting of molding, picture frames and the like, and having a base 12 including support legs for supporting a work surface or area 14, a cutter support frame 16 supporting a cutter element 18 disposed to move in vertical relation to the cutter support frame 16, and a foot pedal 20 operable to displace mechanism 22 that correspondingly actuates the cutter element 18 downwardly toward surface 24. Adjacent the work area 14 is a work guide 28 which may be pivotally rotated about pivot member 30 when guide dogs 32 are loosened, and a workpiece 34 is placed against the guide 28 in the work area 14. The workpiece 34 has a rabbet 36 shown in FIG. 4 and a rabbet holer 38 has a rabbet holder support 40 that fits within the rabbet 36 supporting it as the workpiece is subjected to processing and cutting by the cutter element 18 as is described below, and the rabbet holder 38 has threaded adjustment means and locking means 42 therefor to adjust the rabbet holder support 40 to engage with the rabbet 36 during all successive cutting operations of the cutter element 18 upon the workpiece 34, the rabbet holder support 40 maintaining contact with the rabbet 36 at all times during the cutting processes.

Figure 3:
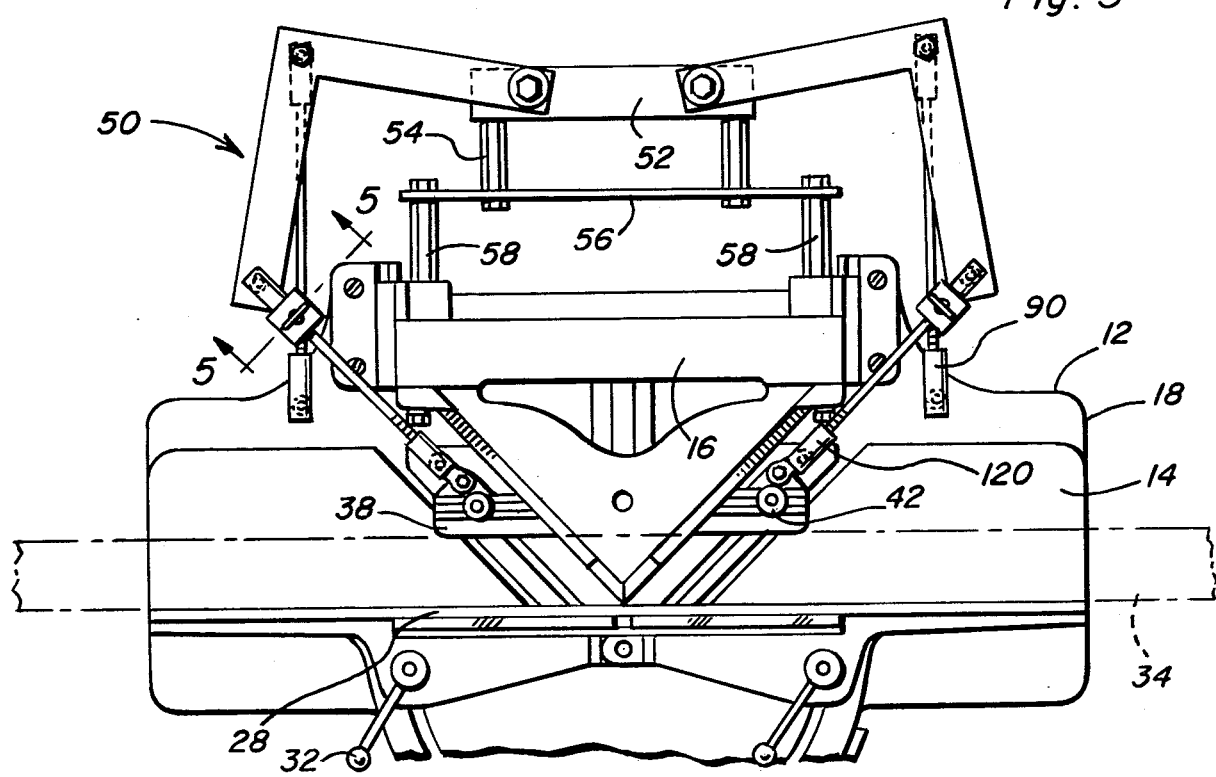
FIG. 3 is also a top plan view and in which the cutter blade and the attachment mechanism are in another position and after cutting with the rabbet holders withdrawn from the workpiece.

The wood frame cutting apparatus as described above is of known construction and method providing precision cut molding for picture frames and the like and exemplary of such mitre machines is a Jyden mitre machine and is supplied with an extension arm support, blades, springs for the foot pedal 20 and the details of the rabbet holders 38 and the rabbet holder support 40. The mitre machine also includes an actuator lever 44 mounted on the front of the mitre machine connected, constructed and arranged to progressively move forward the cutter element 18, for example, from the position shown in FIG. 2 to the position shown in FIG. 3 where the apex of the cutter element 18 is in contact with the guide 28 as the actuator lever is correspondingly and incrementally moved in step-by-step fashion from its position to a rightward position of that shown in FIG. 2.

Assembled with the wood frame cutting apparatus 10 is a work frame cutting support assembly 50 including a support angle iron or bar 52 having on a vertical side thereof a set of spaced rod couplings 54 supported from an intermediate support plate 56 which in turn is supported by a set of intermediate rod couplings 58 that are securably attached to a rear side of the cutter support frame 16. At distal ends of the support bar 52 along its horizontal surface are apertures for mounting bell crank 60 of metal having a corresponding aperture, each aperture receiving a hexagonal head cap screw 62, a flat washer 64, and secured on an underside by a hexagonal nut (not shown). The bell crank 60 has an aperture 66 in its apex 68 and there is an anchor or universal coupling 70 having a threaded recess portion 72 for receiving a threaded end 74 of rod 76, the universal coupling 70 having a ball joint recess receiving a ball member 78 on a threaded member 80 received in the aperture 66 and secured therein by a metal acorn nut 82 as shown. A universal coupling 90 with a threaded recess 92 engages the other threaded end 94 of the rod 76, and the universal coupling 90 is supported from the frame 12 by a member 100 similar in character to the universal coupling 70 described above. By the rod 76 being of fixed but adjustable length, the fulcrum of the bell crank 60 is a fixed distance from the frame 12 but is capable of universal movement. The free end of the bell crank 60 has an aperture 106 for mounting the ball member 108 for a universal coupling 110 similar in construction to the universal coupling 70, the universal coupling 110 threadedly engaged with a rod support block 112 having a rod receiving recess therein for receiving a metal rod 114 securely held in place by engagement with a thumb screw 116 engaging the rod 114 when threaded down in the block 112. This provides adjustment as needed, and the other end of the rod 14 engages a universal coupling 120 by having a threaded portion 118 of the rod 114 engaging a threaded recess in the universal coupling 120. A ball member 122 having its ball portion engaging a ball socket in the universal coupling 120, as shown, is provided so that its distal portion engages a metal coupling 126, such as a link, having apertures, at opposite ends and a solid portion between the apertures, so that the ball member 122 can be secured in one aperture thereof while the other aperture is secured by a hexagonal head cap screw 130 onto an adjacent flat portion of the rabbet holder 38. The left and right sides of the wood frame cutter support assembly 50 are symmetrically constructed and have similar engaging parts and functions.

The rabbet holder 38 is provided with two limited degrees of cross motion or movement, one degree of motion of the rabbet holder 38 being restricted by the recess 140 since the rabbet holder may have a projection interfitting with the recess 140, and the other degree of limited movement or motion of the rabbet holder 38 is that the rabbet holder moves along in continuous engagement with the rabbet 36 by the rabbet holder support 40 continuously sliding along the recess formed and defined by the rabbet. The adjustment to the support assembly 50 is provided so that when the cutter apparatus is in that position shown in FIG. 2 the support assembly 50 is also adjusted so that it is in the position shown in FIG. 2, that is the rabbet holder 38 engages the rabbet 36 and the inclined surface of the rabbet is proximate the adjacent cutter edges of cutter element 18. As the actuator lever 44 is moved to a right position about 3/16 of an inch, this movement brings the blades of the cutter element 18 forward and toward the molding for making repetitive cuts in the molding 34 with each small displacement of the actuator lever 44 to the right.

The function of the rabbet holders 38 is to support the molding rabbet during each cut of the cutter element 18 to prevent splitting of the molding 34, the rabbet holders 38 must be, according to the prior art, moved manually to properly position the rabbet holder under the rabbet after each cut of the blades. This, in the prior art, necessitates the operator placing his hands near the blades each time the rabbet holders 38 are moved and constituting a safety hazard, but by means of the support assembly 50, each forward movement of the cutter elements 18 causes the support bar 52 to be displaced correspondingly forward, (downwardly in FIGS. 1 and 2) and this action by the bell crank acting through the fulcrum and upon the rods connected to the rabbet holders 38, causes the rabbet holder to be correspondingly displaced left and right outwardly so that the inclined edge of the rabbet holders 38 is continuously displaced from the blades of the cutter elements 18 and the rabbet holder support 40 is urged against and rides within the rabbet 36. This maintains the rabbet holders 38 continuously in proper position under the rabbet 36 after each cut or each pass of the blades of the cutter elements 18 without the operator placing his hands near the blades each time the rabbet holders must be moved.

By the function of the support assembly 50 appropriately displacing the rabbet holders 38 each time the cutter elements 18 are moved, there is no need for the operator's hands to come into contact with the cutter elements 18 and to move the rabbet holders, since the support assembly 50 accomplishes the necessary adjustment and relocation of rabbet holders 38. Consequently, with each movement of the blades forward as shown by arrow 136 caused by movement of the actuator lever 44 being incrementally displaced to the right as shown by arrow 138, the bell cranks 60 of the support assembly 50 are flexed toward the back of the blades and the cutter support frame 16 which in turn pulls outwardly as shown by arrows 142 due to the rods 114 acting on the rabbet holders 38 and bringing the rabbet holders out into correct distance with respect to the next pass of the cutter element 18 when the foot pedal 20 is depressed, so that the rabbet holders 38 maintain constant contact with the rabbet 36 and essentially the cutter element 18 has its apex point reached proximate the guide 28 and the work piece 34 has been properly and appropriately cut to form the molding required by the repeated procedures and final cut completes the process. Another work piece 34 may be set in place and the process repeated after moving the actuator lever back to its original position shown in FIG. 2 which in turn resets the support assembly 50 in its initial location and position.

By means of the present invention, it is not necessary nor required for an operator to place his hands in contact with the rabbet supports and the cutter elements, so that the task of cutting one frame or several frames more efficiently is easily accomplished without the operator placing the rabbet supports beneath the molding on each successive cut. The support attachment or assembly 50 is a mechanism which eliminates the need for an operator of a mitre machine placing his hands near the blades to move rabbet holders each time a successive cut of a molding is to be made, and the support assembly 50 mechanically moves the rabbet holders out as shown by arrows 140 automatically each time the lever 44 moves the cutter elements 18 to an incremental position as shown by arrow 136.

While the support assembly 50 is shown to include the plate 56 and sets of rod couplings 54, 58, it is of course within the purview of the present invention that the present support bar 52 may be mounted on the rear of the cutter support frame 16 by only a single set of rod couplings and omitting the plates 56. Also within the purview of the invention, the rabbet holders 38 need not have projections riding or engaging with the recess 140, and the entire support assembly 50 can be adjusted with the several adjust means 116 and the like providing necessary adjustment for the rabbet holders to be correspondingly displaced outwardly as shown by arrows 142 to compensate for inward movement of the blades of the cutter elements 18 as shown by arrows 136.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A safety attachment for use with a cutting apparatus which includes a cutting member adapted to reciprocate vertically with respect to a fixed frame structure, the safety attachment comprising a support bar mounted for movement with the cutting apparatus having successive cutting positions and movable through successive work positions, at least one crank means having one end pivotally coupled to the support bar, having its fulcrum connecting means for fixedly positioning the fulcrum from a reference point on the cutting apparatus, and having the other end of the crank means free and containing an aperture therein, a working rod threaded at one end and threadedly engaging a coupling means and an intermediate portion thereof proximate about the other end of the working rod adjustable engaging in slidable relation with a rod support means having pivot means coupled to said aperture, and rabbet holder means having linking means coupling between the rabbet holder means and the threadedly engaging coupling means.

2. The invention of claim 1 wherein each of the connecting means of the fulcrum, the pivot means for the aperture, the connecting means for the fulcrum and the linking means coupling the rabbet holder means include universal coupling means.

3. The invention according to claim 1 wherein the universal coupling means is a ball joint and the safety attachment when moved to the work position moves the rabbet holder means automatically to the work to be cut each time blades of the cutting apparatus are moved in a direction to make a futher cut, and the operator's hands cannot come into contact with the cutting apparatus while it is in operation.

4. A safety attachment for use with a cutting apparatus which includes a cutting member adapted to reciprocate vertically with respect to a fixed frame structure, and in which rabbet holder means are provided for continuously engaging a rabbet on a workpiece, the safety attachment comprising a support bar mounted for movement with the cutting apparatus as it moves progressively toward and into engagement for repetitive cuttings of the workpiece, crank means having its fulcrum fixedly positioned from a reference point on the cutting aparatus, one end of the support bar pivotally connected to an adjacent end of the crank means and the other end of the crank means including means adjustably and pivotally connected with the rabbet holder means and urging the rabbet holder means into engagement with the rabbet as the rabbet holder means is moved away from the cutting member.

5. The invention according to claim 4 wherein a said means adjustably and pivotally connected with the rabbet holder means includes a rod, a block having a passageway therethrough slidably receiving the rod, a ball and socket connection between the block and crank means and between the rod and rabbet holder means, a thumb screw in the block for securing the rod adjustably in said block.

6. A safety attachment for a cutting apparatus for a wooden workpiece having a rabbet, said cutting apparatus including an adjustable rabbet support which engages and supports the rabbet in the workpiece, said cutting apparatus also including a vertically reciprocating cutting member having a V-shaped blade which progressively moves toward the workpiece to form mitered ends on adjacent portions of the workpiece, said attachment comprising a support bar connected with and moving with the cutting member as it moves toward and away from the workpiece, a pair of bell cranks each having a fulcrum supported from the cutting apparatus and one end pivotally connected with the support bar to move the other end of each bell crank in an arcuate path as the support bar moves with the cutting member, and adjustable rod means interconnecting the other end of each bell crank and one of said rabbet supports to move the rabbet supports out of the path of movement of the blade during reciprocating movement while maintaining supporting engagement with the rabbet during progressive movement of the blade toward and away from the workpiece.

* * * * *